United States Patent Office 2,776,205
Patented Jan. 1, 1957

2,776,205
IRON-FLUORINE COMPOUND

William A. La Lande, Jr., Plymouth Meeting, and Isadore Mockrin, Philadelphia, Pa., assignors to The Pennsylvania Salt Manufacturing Company, Philadelphia, Pa., a corporation of Pennsylvania No Drawing. Application May 24, 1952, Serial No. 289,901

9 Claims. (Cl. 75—53)

This invention relates to a new class of iron-fluorine compounds and compositions and to the method of making the same.

The materials of the present invention are unique in that they contain, in chemical combination, fluoride or fluorides of both ferrous and ferric iron together with combined hydrogen fluoride and water. Though their exact formula is not known, they can be expressed generally by the empirical formula $$Fe_a^{+2}Fe_b^{+3}F_c \cdot dHF \cdot eH_2O$$

in which $a$ is 0.4 to 3.5, $b$ is 1.0, $c$ is 3.8 to 10, $d$ is 0.25 to 1.9, and $e$ is 1.5 to 5.0. In obtaining this general formula, which is based on analysis of the iron-fluorine compositions, $b$ was arbitrarily selected as equal to one (1).

The compounds are prepared by reacting an aqueous solution of hydrogen fluoride with ferrous carbonate, siderite preferably being used as the ferrous carbonate source. The reaction is preferably carried out in an iron reactor though a copper reactor may be used if desired or the reactor may be made from some other metal not appreciably attacked by the reactants. Ordinary steel reactors have been found to be suitable though stainless steel should be avoided since this is readily attacked by the aqueous hydrogen fluoride solution.

Where the composition is prepared in an iron vessel, the proportionate ferrous iron content and fluorine content are generally somewhat higher than that obtained when the reaction is carried out in a copper vessel. The exact reason for this is not known, but it can probably be ascribed to the iron of the vessel in which the reaction is carried out. When the reaction is carried out in a copper vessel, the iron-fluorine product (besides unreacted siderite) is essentially a compound having the probable empirical formula $$Fe_{0.9-1.2}^{++} Fe^{+++} F_{4.8-5.4} \cdot 0.8-1.9HF \cdot 3.5-4.0H_2O$$

which can also be expressed in the form $$(0.9-1.2)FeF_2 \cdot 1FeF_3 \cdot (0.8-1.9)HF \cdot (3.5-4.0)H_2O$$

From X-ray patterns of products obtained by the reaction of siderite and aqueous HF in both iron vessels and copper vessels, it appears that the iron-fluorine product obtained from the iron reactor is probably a mixture of the new compound $$Fe_{0.9-1.2}^{++} \cdot Fe^{+++} \cdot F_{4.8-5.4} \cdot 0.8-1.9HF \cdot 3.5-4.0H_2O$$

together with another iron-fluorine compound, probably ferrous fluoride. The iron-fluorine composition obtained by reacting the siderite and aqueous HF in an iron container can be generally represented by the empirical formula $$(1.4-3.5)FeF_2 \cdot FeF_3 \cdot (0.4-1.5)HF \cdot (3.0-5.0)H_2O$$

In preparing the compounds of the present invention, an aqueous solution of hydrogen fluoride is mixed with siderite preferably in the proportion of 0.3 to 0.5 part hydrogen fluoride per part siderite by weight. We prefer to use the hydrogen fluoride in concentrations of 50 to 70%, though the concentration of hydrogen fluoride does not appear to be critical. The reactants are preferably maintained at a temperature of approximately 50° to 110° C. for two to six hours. The product is then dried at a temperature of 80° to 110° C. until substantially no evolution of hydrogen fluoride is noted and the product assumes a substantially constant weight.

The reaction and drying can, if desired, be carried out in the same vessel if the vessel is supplied with a suitable agitator. If suitable agitation is not employed during the drying step, and the drying is accomplished in the reaction vessel, considerable difficulty is encountered in removing the final product from the vessel. By employing suitable agitators, a dry granular free-flowing product is obtained. This product is an intimate mixture of unreacted siderite, in amounts of 2 to 30% (percent by weight or parts by weight being intended in the present specification and claims wherever such values are given), though generally present in amounts of 10 to 25%, and an iron-fluorine product of the type heretofore described. Some cryolite, which is a siderite contaminant, may also be present as well as excess $H_2O$. The latter is readily removed by heating at approximately 110° C.

During the drying step, temperatures in excess of 140° C. should be avoided since the iron-fluorine products of the present invention appear to decompose at temperatures much in excess of this amount. The iron-fluorine products, on analysis, are found to contain on a weight basis, 10 to 40% ferrous iron, 6 to 32% ferric iron, and 22 to 42% fluorine, the fluorine always being present in amounts of at least 1.5% by weight in excess to that required to satisfy the iron. As heretofore stated, the composition of the final product varies somewhat depending on whether an iron or copper reactor is employed; the composition obtained from an iron reactor generally containing 28 to 40% ferrous iron, 6 to 15% ferric iron and 28 to 37% fluorine, whereas the product obtained from a copper reactor generally contains 10 to 30% ferrous iron, 10 to 32% ferric iron and 22 to 42% fluorine.

In order to better illustrate the method of manufacturing the products of the present invention, the following examples are given. These examples, however, are given for purposes of illustration only and the invention is not to be limited thereto.

Example 1

Thirty-eight pounds of 60% HF (aqueous) was placed in a steam-jacketed reactor together with 28 pounds of finely divided siderite. The mixture was heated to 66° C. for about twenty minutes and 28 more pounds of siderite then added. Heating of the suspension was then continued for twenty to thirty minutes at the same temperature of about 66° C. After this time, the final addition of siderite, 27 pounds, was made together with 20 pounds more 60% HF, the total addition of siderite and HF being—siderite 83 pounds, 60% HF 58 pounds. The temperature was then raised to between 93° to 104° C. and the slurry heated at this temperature for another four and one-half hours. Throughout the reaction, the slurry was air agitated. Fumes of HF are given off during the reaction.

Where air agitation alone is used, excessive heating should be avoided or the mass will solidify and necessitate chipping for removal.

After the final heating, the thick slurry was poured into trays and allowed to cool to room temperature. A greenish-tan brick-like slab was formed which was then broken up and placed in drying trays where it was dried at a temperature of about 100° C. until no further fumes of HF were given off. The final product had a brick-red color.

*Example 2*

Two hundred pounds of ground siderite was charged into a steam-jacketed 20 gallon Baker Perkins Universal Mixer equipped with a sigma arm mixer. Sixty pounds of 60% aqueous HF was then added and the slurry was mixed while heating to a temperature of between 50° to 110° C. until the mixture had a reasonably dry appearance which occurred after about two hours. Thirty more pounds of 60% HF was then added and the stirring continued for another hour after which time a last addition of 30 pounds of 60% HF was made. Stirring was continued while maintaining the temperature at around 100° C. until no further fumes of HF were detected given off from the reaction mixture, the total time being about four hours.

About 200 pounds of product was obtained which contained approximately 15% unreacted siderite, 4% cryolite, the remainder being the iron-fluorine compound heretofore described. It was found that generally larger amounts of unreacted siderite were present where a coarser ground siderite was used in carrying out the reaction. The cryolite present in the product resulted from the cryolite contaminant being present in the siderite used.

In an attempt to find other raw materials which could be used for the siderite or ferrous carbonate to obtain the iron-fluorine compounds of the present invention, aqueous hydrogen fluoride solutions were reacted with the following materials: hematite, magnetite, limonite, forging scale, and red mud. The resulting products, on analysis, however, were found to be substantially different from the iron-fluorine compounds of the present invention, the product in each instance consisting, insofar as the iron and fluorine content was concerned, primarily of hydrated $FeF_3$. Hydrogen fluoride was also reacted with iron filings; however, the product, which had an intense brown color, was found to have only a trace of hydrogen fluoride, though, on analysis, it was found to contain both ferrous and ferric fluoride.

The iron-fluorine compounds and compositions of the present invention are found to have a substantial effect on gray iron when added to gray iron melts in small amounts. The addition of these materials produces castings having substantially improved machinability, resistance to wear and increased strength as described in our copending application Serial No. 289,902 filed May 24, 1952.

When mixed with at least 5% water by weight and compressed, the iron-fluorine compositions of the present invention are readily bonded and can thus easily be formed into suitable briquettes for metal treating. When water in excess of 20% by weight is used, water will be found to squeeze out on compression, amounts over 20% water are, therefore, generally not recommended.

Apparently the bond is formed by some chemical reaction since the final product has a definitely ceramic appearance. The compressed product is also dry and exhibits substantially no change in weight over extended periods. In preparing these ceramic-like materials, pressures as low as 2500 pounds per square inch can be used, but for the best results it is generally preferred to use pressures of 4000 to 7000 pounds per square inch. Also, even though briquettes can be formed using mixtures containing only 5% by weight added water, better bonding is obtained when the siderite-hydrogen fluoride products are mixed with 10 to 20% water by weight before compressing.

The compounds of the present invention are also believed to be beneficial when used in rimming steel, as a grain refiner for magnesium and as a mineralizer when added to Portland cement or other refractory material. They have further been found, on tests by injection of cockroaches, to have insecticidal activity.

Having thus described our invention, we claim:

1. An iron-fluorine composition having the empirical formula $$Fe_a^{++}Fe_b^{+++}F_c^-.dHF.eH_2O$$ 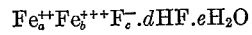

in which $a=0.4$ to 3.5, $b=1.0$, $c=3.8$ to 10, $d=0.25$ to 1.9, and $e=1.5$ to 5.0.

2. As a product of manufacture, a compound having in chemical combination $Fe^{++}$, $Fe^{+++}$, $F^-$, HF and $H_2O$ and expressed by the empirical formula $$aFeF_2.bFeF_3.dHF.eH_2O$$ 

where $a=0.9$ to 1.2, $b=1.0$, $d=0.8$ to 1.9 and $e=3.5$ to 4.0.

3. The method of making the composition of claim 1 comprising heating for two to six hours at a temperature of 50° to 110° C. a slurry of one part siderite with 0.3 to 0.48 part hydrogen fluoride in an aqueous solution and drying the reaction mixture at a temperature not in excess of 140° C.

4. An iron-fluorine composition containing in combination 10 to 40% of ferrous iron, 6 to 32% ferric iron chemically combined with a stoichiometric quantity of fluorine, and 22 to 42% fluorine, said fluorine being present in an amount of at least 1.5% over that which could be considered as combined with the iron.

5. An iron-fluorine composition containing in combination 28 to 40% ferrous iron, 6 to 15% ferric iron chemically combined with a stoichiometric quantity of fluorine and 28 to 37% fluorine, said fluorine being present in an amount of at least 1.5% over that which could be considered as combined with the iron.

6. An iron-fluorine composition containing in combination 10 to 30% ferrous iron, 10 to 32% ferric iron chemically combined with a stoichiometric quantity of fluorine and 22 to 42% fluorine, said fluorine being present in an amount of at least 1.5% over that which could be considered as combined with the iron.

7. A product of manufacture from reaction of siderite with an aqueous solution of hydrogen fluoride comprising 10 to 25% siderite, 2 to 6% cryolite and 65 to 90% of an iron-fluorine composition of claim 1.

8. As a product of manufacture, a ceramic-like material prepared by subjecting the product of claim 1, containing at least 5% water by weight, to a pressure of at least 2500 pounds per square inch.

9. As a product of manufacture, a ceramic-like material prepared by mixing the product of claim 1 with 10 to 20% by weight water and subjecting the resulting mixture to a pressure of 4000 to 7000 pounds per square inch.

References Cited in the file of this patent

UNITED STATES PATENTS

| 48,483 | Everett | June 27, 1865 |

FOREIGN PATENTS

| 540,075 | Great Britain | Oct. 3, 1941 |

OTHER REFERENCES

Chemical Abstracts, vol. 41 (1947), page 6125 (c).

Encyclopedia of Chemical Reactions (Jacobson), pub. by Reinhold Publ. Corp. (New York), 1951. (Vol. IX, page 9 of interest.)

Comprehensive Treatise on Inorganic and Theoretical Chemistry, vol. 14, page 4. Edited by Mellor; published by Longmans, Green and Co., New York.